(12) United States Patent
Gilles et al.

(10) Patent No.: US 7,049,381 B2
(45) Date of Patent: *May 23, 2006

(54) POLYMERIZABLE COMPOSITIONS FOR MAKING TRANSPARENT POLYMER SUBSTRATES, RESULTING POLYMER SUBSTRATES, AND USES THEREOF IN OPTICS

(75) Inventors: Richard Gilles, Alfortville (FR); Primel Odile, Vincennes (FR); Yean Leanirith, Longjumeau (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 436 days.

This patent is subject to a terminal disclaimer.

(21) Appl. No.: 09/824,998

(22) Filed: Apr. 2, 2001

(65) Prior Publication Data

US 2002/0061993 A1  May 23, 2002

Related U.S. Application Data

(63) Continuation of application No. PCT/FR00/02200, filed on Jul. 31, 2000.

(30) Foreign Application Priority Data

Aug. 2, 1999 (FR) .................................. 99 10031

(51) Int. Cl.
*C08F 124/00* (2006.01)
(52) U.S. Cl. ...................... 526/273; 526/301; 526/318; 526/318.1; 526/318.2; 526/320; 526/323.2; 623/6.11
(58) Field of Classification Search ............ 623/6, 623/11; 526/273, 301, 318, 318.1, 318.2, 526/320, 323.2
See application file for complete search history.

(56) References Cited

U.S. PATENT DOCUMENTS

| | | | | |
|---|---|---|---|---|
| 4,912,185 A | * | 3/1990 | Toh | .............................. 526/301 |
| 5,183,870 A | * | 2/1993 | Fukushima et al. | ......... 526/273 |
| 5,566,027 A | * | 10/1996 | Saitoh et al. | ................ 359/796 |
| 5,880,171 A | * | 3/1999 | Lim et al. | .................... 523/106 |
| 6,677,420 B1 | * | 1/2004 | Richard et al. | ............. 526/301 |

FOREIGN PATENT DOCUMENTS

| | | |
|---|---|---|
| EP | 0 441 383 | 8/1991 |
| EP | 0 453 149 | 10/1991 |

OTHER PUBLICATIONS

Co-pending U.S. Appl. No.10/061,761, filed Feb. 1, 2002, by Gilles Richard et al.

* cited by examiner

*Primary Examiner*—Bernard Lipman
(74) *Attorney, Agent, or Firm*—Fulbright & Jaworski L.L.P.

(57) ABSTRACT

Polymerizable compositions for making transparent polymeric substrates, resulting transparent polymeric substrates and the applications thereof in optics. The composition comprises:

from 35 to 70 parts by weight of one or more monomers (I) of formula:

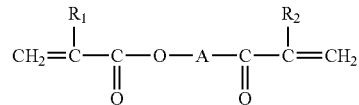

wherein
$R_1$ and $R_2$ represent H or $CH_3$,
A is a divalent moiety of formula:

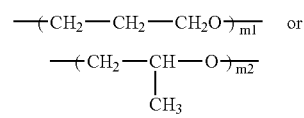

m1 and m2 each are an integer in the range of 4 to 20, from 5 to 50 parts by weight of a monomer (II) comprising at least a urethane unit and at least two (meth)acrylate functions, and from 5 to 40 parts by weight of a monomer (III) with a high Abbe number and comprising one or more methacrylate functions, the total of the monomers (I), (II) and (III) representing 100 parts by weight.

20 Claims, No Drawings

US 7,049,381 B2

POLYMERIZABLE COMPOSITIONS FOR MAKING TRANSPARENT POLYMER SUBSTRATES, RESULTING POLYMER SUBSTRATES, AND USES THEREOF IN OPTICS

This application is a continuation of International Application No. PCT/FR00/02200 filed 31 Jul. 2000, which claims priority to French Application No. FR99/10031 filed 2 Aug. 1999.

This invention relates to the field of polymerizable monomeric compositions that, after polymerization, provide transparent polymeric substrates and to their use for manufacturing optical lenses, specially ophthalmic lenses.

The optical lenses for ophthalmic use made in an organic polymeric material have been known and used for many years.

One of the most common materials is obtained through polymerization of compositions containing diethylene glycol diallyl carbonate (hereafter called CAD).

This basic monomer is commercially available, for example, under the trademark CR39®.

An example of a commercially available ophthalmic lens in such a material is the ORMA® lens.

Such material intrinsically shows good mechanical properties, particularly a good impact and abrasion resistance as well as a good resistance to organic solvents.

Such material may also be easily coloured upon customer's request.

One of the disadvantages associated with the use of CAD lies in that the polymerization of such monomer is essentially carried out by a thermal treatment, with particularly long heating cycles (several hours, sometimes several days).

It should therefore be desirable to reduce the length of these polymerization cycles in order to, i.e., be able to satisfy, within the shortest time possible, the customers' requests, in order to limit the standstill of the lens production moulds and reduce the manufacturing costs.

Moreover, while being usually satisfactory, it is also desirable to provide materials showing improved intrinsic properties compared to materials derived from CAD.

Different material types have already been suggested in the prior art.

U.S. Pat. No. 4,138,538 discloses allyl monomer compositions such as CAD, containing a methacrylic monomer such as a polyethylene glycol di(meth)acrylate.

Such methacrylic monomer can be used in amount of 20% to 70% by weight of the polymerizable mixture.

The mixture is photopolymerized, preferably at a low temperature, whereupon a thermal treatment is carried out.

U.S. Pat. No. 4,650,845 discloses monomeric compositions containing:
  from 0 to 100 parts by weight of a first component which is a urethane poly(meth)acrylate monomer and from 100 to 0 parts by weight of a second component which is a composition comprising:
    from 30% to 60% by weight of a polyacrylate monomer,
    from 20% to 70% by weight of a shrinkage modifier upon polymerization, and
    from 0% to 30% by weight of a diluting monomer.

The compositions are preferably photopolymerized.

In pratice, the described compositions generally provide highly crosslinked polymers due to the presence of monomers comprising many functional groups.

The compositions usually comprise monomers which comprise at least 4 (meth)acrylate groups; moreover, the patent does not particularly relates to compositions comprising high Abbe number monomers.

U.S. Pat. No. 4,912,185 discloses polymerizable monomeric compositions for manufacturing ophthalmic lenses or video discs, comprising at least a monomer of polyoxyalkylene glycol acrylate or methacrylate, at least a crosslinking agent comprising several unsaturated functions and at least a urethane monomer having from 2 to 6 methacrylic end groups.

In practice, the above-mentioned crosslinking agent has from 3 to 4 vinylic, acrylic or methacrylic functional groups.

Such compositions are preferably cured by mixed UV/heat polymerization.

EP-A-453,149 discloses compositions comprising a polyoxyalkylene glycol di(meth)acrylate monomer, a monomer containing a bisphenol-A unit and providing, through homopolymerization, a polymer with a refraction index higher than 1.55 and a urethane monomer having from 2 to 6 (meth)acrylic end groups.

The polymerization is preferably a mixed UV/heat polymerization.

None of said two documents explicitely relates to the incorporation of monomers with a high Abbe number and in particular of monofunctional cyclic monomers with a high Abbe number.

U.S. Pat. No. 5,183,870 discloses compositions containing from 10% to 60% by weight of a polybutylene glycol di(meth)acrylate, from 20% to 80% by weight of a urethane poly(meth)acrylate, from 5% to 60% by weight of a specific mono(meth)acrylate monomer and from 0% to 60% by weight of a compound having at least a double polymerizable bond.

According to U.S. Pat. No. 5,183,870, the selection of the polybutylene glycol di(meth)acrylate is essential to achieve a good compromise between the impact resistance properties and a low water absorption.

Comparative example 7 discloses a composition comprising a polyethylene glycol di(meth)acrylate, a urethane dimethacrylate and a tricyclo [$5.2.1.0^{2.6}$]decan-8-yl methacrylate.

The polymer resulting from this composition has a high water absorption rate of 3.6%.

U.S. Pat. No. 5,880,171 discloses photopolymerizable compositions comprising:
  from 20% to 90% and preferably at least 50% by weight of a urethane, epoxy or polyester oligomer, the endings of which are (meth)acrylates and from 5% to 80% by weight of an optional diluting agent which is a (meth)acrylate and/or a tri-, tetra- or poly(meth)acrylate group ended hydrocarbon diol ester.

This patent does not explicitely relates to the use of monofunctional monomers with a high Abbe number.

U.S. Pat. No. 5,566,027 discloses photopolymerizable compositions comprising from 25% to 45% of a urethane polyester oligomer comprising a plurality of (meth)acrylic groups bound to the polyester oligomer via a urethane group and having a molecular weight of at least 700, from 31% to 70% by weight of a polyfunctional (meth)acrylate with an average molecular weight less than 700, and from 5% to 55% by weight of a monofunctional (meth)acrylate.

This composition is used as a varnish to be applied to ophthalmic lenses.

Manufacturing the lens body from such a composition is not contemplated.

As it can therefore be seen, many polymerizable compositions leading to materials with a refraction index of about 1.5 have been suggested in the prior art, without however being totally satisfactory in obtaining transparent polymeric substrates, to be used in the optical field.

A first object of the present invention is therefore to provide new polymerizable monomeric compositions giving transparent polymeric substrates able to be substituted to CAD based polymers, i.e. whose properties are globally similar to those of CAD and are preferably improved.

In particular, the optical substrates must have the whole following features
- a high transparency (transmission generally higher than 85% and preferably higher than or equal to 90%), with the absence of or optionally a very small light diffusion,
- a small density lower than 1.4, preferably lower than 1.3 and more preferably lower than 1.2,
- a refraction index between 1.48 and 1.52,
- a high Abbe number, higher than or equal to 40, preferably higher than or equal to 45 and more preferably higher than or equal to 50, in order to prevent chromatic aberrations,
- a lack of colour after polymerization, particularly a small yellow index and a lack of yellowness in the course of time,
- a good impact resistance (particularly the uncoated glass should preferably successfully satisfy the ball drop FDA test),
- a good resistance to the action of static stresses,
- a good abrasion resistance,
- a good behaviour to several treatments (deposit of hard, anti-reflection, anti-impact primary coatings, . . . ) and particularly a good aptitude to colouration,
- a good behaviour to surfacing and overflow treatments without any alteration of the glass global geometry during these operations, and
- a low water absorption rate.

A second object of this invention is to provide compositions that can be easily and rapidly polymerized, particularly that can be polymerized using photopolymerization techniques or mixed photopolymerization and thermal polymerization techniques allowing to reduce the manufacturing cycle times for the lenses.

The composition of polymerizable monomers according to the invention comprises:
from 35 to 70 parts by weight of one or more monomers (I) of formula:

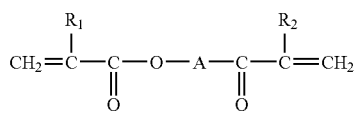

wherein
$R_1$ and $R_2$ represent H or $CH_3$,
A is a divalent moiety of formula:

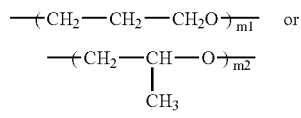

m1 and m2 each are an integer in the range of 4 to 20,
from 5 to 50 parts by weight of a monomer (II) comprising at least a urethane unit and at least two (meth)acrylate functions, and
from 5 to 40 parts by weight of a monomer (III) with a high Abbe number and comprising one or more methacrylate functions, the total of the monomers (I), (II) and (III) representing 100 parts by weight.

The first important component of the compositions according to the invention is the monomer(s) (I) with the above-mentioned formula.

More precisely, these are (meth)acrylic esters of polypropylene glycol comprising a central moiety A, either straight or branched, as defined above.

The monomer(s) (I) of the first component are monomers with relatively high chain lengths, this means that the number of polypropylene glycol units present in the moiety A must be equal to or higher than 4 and preferably in the range of 4 to 20 for each of the monomers (I).

When several monomers (I) are used in a mixture, a mean value can be defined as follows:

$$\overline{m} = \sum_{m=4}^{20} X_m \cdot m$$

wherein $X_m$ is the weight ratio of monomer (I) for which A includes m polypropylene glycol units in its chain based on the total weight of monomers of formula (I) of the mixture.

When commercial products are used, as the first component according to the invention, which already are mixtures of monomer, this value $\overline{m}$ can be easily reached by carrying out a HPLC analysis of the mixture and by calculating the ratio:

$$X_m = \frac{Sm}{S \text{ total}}$$

where Sm is the peak area corresponding to the monomer (I) having m propylene glycol units in the divalent moiety A and S total is the total surface of all the peaks corresponding to the monomers (I) for which m is in the range of 4 to 20.

According to the invention, mixtures of several monomers (I) are preferably used for which the mean value $\overline{m}$ as defined above is in the range of 5 to 9, preferably between 6 and 7.

Still preferably, the monomers (I) have a branched structure, this means that the divalent moiety A represents:

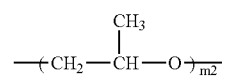

m2 having the previously defined meaning.

The compositions according to the invention comprise from 35 to 70 parts by weight of monomer (I), the total weight of monomers (I), (II) and (III) representing 100 parts by weight.

The composition preferably comprises from 40 to 60 parts by weight of monomer (I), in the formulation of which m1 and m2 are integers from 5 to 10.

The monomers (I) are commercially available from Cray Valley company under the trade name CD6440P, from Shin Nakamura company under the trade name 9PG and from UCB company under the trade name PPG 400.

CD6440P is a mixture of several monomers (I), the central unit of which is:

$$-\!\!\left(\!CH_2-\underset{\underset{CH_3}{|}}{CH}-O\right)_{\overline{m2}}$$

m2 being an integer assuming values from 3 to 10 depending on the following mass ratios:
$m_2$=3 2%
$m_2$=4 8%
$m_2$=5 14%
$m_2$=6 20%
$m_2$=7 27%
$m_2$=8 19%
$m_2$=9 9%
$m_2$=10 1%
with a mean value $\overline{m}_2$=6.6

The first component generally provides softness and flexibility to the polymeric network constituting the final substrate, while allowing to obtain a low water recovery rate.

The second component of the compositions according to the invention is a monomer (II) comprising at least a urethane unit and at least two methacrylate functions.

Two monomer (II) families with urethane units are preferably used.

The first family includes urethane di(meth)acrylate oligomers and, preferably, those that are aliphatic polyesters.

Examples of such compounds are the urethane di(meth)acrylate oligomers from Cray Valley company, particularly the product known under the trade name CN964®.

The second family is made up of the monomers (II) with the following formula:

$$Q[W\!-\!O\!-\!\underset{\underset{O}{\|}}{C}\!-\!\underset{\underset{R}{|}}{C}\!=\!CH_2]_n$$

wherein Q is a moiety of a valence n, with a straight, branched or cyclic structure, comprising at least two units of formula:

$$-\underset{\underset{O}{\|}}{C}-NR'-$$

W is a divalent alkyl moiety, with a straight or branched structure, containing from 1 to 5 carbon atoms,
n varies from 2 to 4,
R represents H or $CH_3$, and
R' represents H or a valence link.

W preferably represents the moiety —$CH_2CH_2$—.

Moiety Q is preferably a divalent moiety of formula:

$$-\!O\!-\!\underset{\underset{O}{\|}}{C}\!-\!NR'_1\!-\!X\!-\!NR'_2\!-\!\underset{\underset{O}{\|}}{C}\!-\!O\!-$$

wherein X represents a straight or a branched divalent alkyl chain having from 1 to 15 carbon atoms, preferably from 8 to 12 carbon atoms.

$R'_1$ and $R'_2$ independently from one another represent H or $CH_3$.

Such a monomer is commercially available under the tradename PLEX 6661-0 and has the following formula:

$$CH_2\!=\!\underset{\underset{CH_3}{|}}{C}\!-\!\underset{\underset{O}{\|}}{C}\!-\!O\!-\!CH_2\!-\!CH_2\!-\!O\!-\!\underset{\underset{O}{\|}}{C}\!-\!NH\!-\!CH_2\!-\!\underset{\underset{R'_3}{|}}{C}\!-\!CH_2$$

$$CH_2\!=\!\underset{\underset{CH_3}{|}}{C}\!-\!\underset{\underset{O}{\|}}{C}\!-\!O\!-\!CH_2\!-\!CH_2\!-\!O\!-\!\underset{\underset{O}{\|}}{C}\!-\!NH\!-\!CH_2\!-\!CH_2\!-\!\underset{\underset{CH_3}{|}}{C}\!-\!R'_4$$

wherein $R'_3$ and $R'_4$ represent, independently from one another, H or $CH_3$.

Amongst the second monomer (II) family, other preferred monomers are those in the formulation of which Q is a trivalent moiety of formula:

(triazine ring structure)

Commercially available monomers of this type have the following formula:

$$CH_2\!=\!\underset{\underset{R''_3}{|}}{C}\!-\!\underset{\underset{O}{\|}}{C}\!-\!O\!-\!CH_2CH_2\!-\!N\cdots N\!-\!CH_2CH_2\!-\!O\!-\!\underset{\underset{O}{\|}}{C}\!-\!\underset{\underset{R''_1}{|}}{C}\!=\!CH_2$$

$$CH_2\!-\!CH_2\!-\!O\!-\!\underset{\underset{O}{\|}}{C}\!-\!\underset{\underset{R''_2}{|}}{C}\!=\!CH_2$$

wherein $R''_1$, $R''_2$ and $R''_3$ represent, independently from one another, H or $CH_3$.

The monomer of the above formula in which $R''_1$, $R''_2$ and $R''_3$ each represent a methyl group is available from Cray Valley company under the trade name SR290.

The monomer of the above formula in which $R''_1$, $R''_2$ and $R''_3$ each represent a hydrogen atom is available from Cray Valley company under the trade name SR368.

From a general point of view, monomers of the (II) type are preferably selected and they increase the glass transition temperature of the final polymer.

The monomer (II) is present in a proportion of from 5 to 50 parts by weight, preferably from 30 to 50 and more preferably from 30 to 40 parts by weight based on the total weight of monomers (I), (II) and (III).

Commercially available monomers (II) include:
1. Aliphatic urethane diacrylates
   CN934, 964, 965, 963, 966, 967, 981 from CRAY VALLEY company,
   Ebecryl 230, 244, 245, 270, 284, 285, 4830, 4835, 8800 from UCB company.
2. Aromatic urethane diacrylates
   CN970, 972, 973 and 976 (CRAY VALLEY),
   Ebecryl 210, 215 and 4244 (UCB).
3. Urethane acrylates with a functionality higher than 2
   Triacrylates:
   CN920, 922, 923, 924 and 929 (CRAY VALLEY)
   Ebecryl 204, 205, 254, 264 and 265 (UCB)
   Tetracrylates:
   CN925, 945, 923 and 995 (CRAY VALLEY)
   U4HA (SHIN NAKAMURA)
   Hexaacrylates:
   CN975 (CRAY VALLEY)
   Ebecryl 220, 1290, 2220, 5129 (UCB)
   U6HA (SHIN NAKAMURA)
4. Aliphatic urethane methacrylates
   PLEX66610 (ROHM)
   U4H (tetrafunctional methacrylate from SHIN NAKAMURA).

The third essential component of the polymerizable monomeric compositions according to the invention is a monomer (III) with a high Abbe number and including one or more (meth)acrylate functions.

With a high Abbe number monomer, it is to be understood a monomer able to generate, through homopolymerization, a transparent polymer with a high Abbe number, that is to say, of a least 50 and preferably of at least 55.

The high Abbe number monomer preferably includes at least one non aromatic cyclic or polycyclic hydrocarbon moiety.

The monomer (III) is preferably selected amongst at least one of the monomers of the following formulae:

In these formulae,

Y is a divalent moiety selected amongst —O—, —CH$_2$—, —C(CH$_3$)$_2$—, —C(H)(CH$_3$)—, Z is a divalent moiety selected amongst —(CH$_2$)p—O—, p being an integer from 1 to 4, and

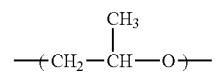

$R_a$, $R_b$ represent H or CH$_3$, $R_c$, $R_d$ represent, independently from one another, a straight or a branched alkyl moiety, having from 1 to 6 carbon atoms, $R_i$, $R_j$ represent, independently from one another, a straight or a branched alkyl moiety, having from 1 to 10 carbon atoms, w is an integer of between 1 to 3, x is an integer of between 0 to 3, y is an integer of between 0 to 3, providing that x+y is equal to or higher than 1, k is an integer of between 0 to 6, l is an integer of between 0 to 6, r is an integer of between 0 to 6, s is an integer of between 0 to 6, z is an integer of between 0 to 3 and t is an integer of between 0 to 3.

The particularly preferred monomers (III) are selected amongst the. monomers of formulae:

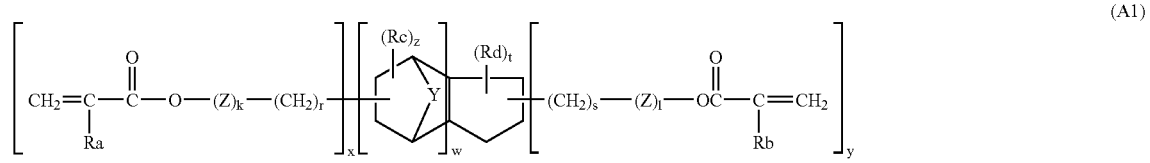

(A1)

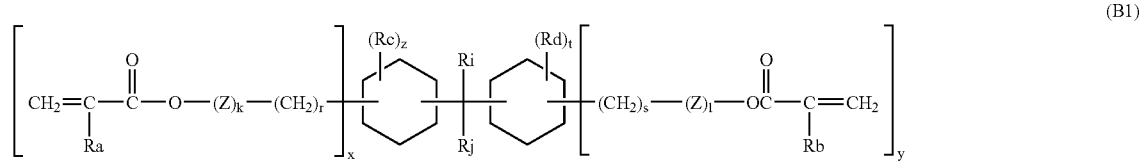

(B1)

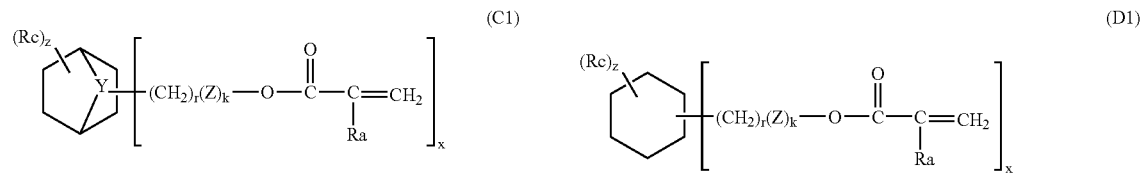

(C1)                    (D1)

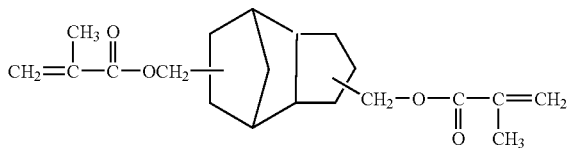

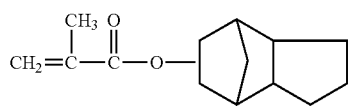

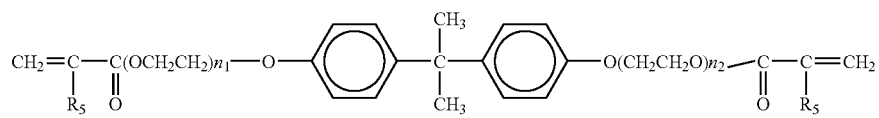

-continued

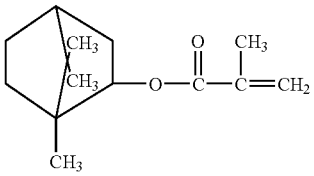

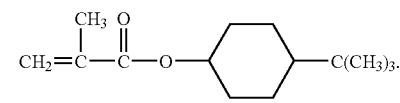

The monomer (III) is used in the compositions according to the invention in a ratio of from 5 to 40 parts by weight, preferably from 10 to 30 parts by weight based on the total weight of the monomers (I), (II) and (III).

The compositions of monomers according to the invention may include other polymerizable monomers (IV) different from the monomers (I), (II) and (III) that are able to integrate the final resulting network, especially monomers polymerizable by radical mechanism.

Such monomers allow to adjust the properties of the resulting transparent substrates.

These monomers can be present in the compositions according to the invention in a proportion of 0% to 40% by weight, preferably of 0% to 20%, based on the total weight of the monomers (I), (II) and (III).

The following monomers can be mentioned amongst these monomers (IV):

alkyl (meth)acrylates such as methyl (meth)acrylate and ethyl (meth)acrylate, cycloalkyl (meth)acrylates such as cyclohexyl (meth)acrylate and dicyclopentyl (meth)acrylate, phenyl (meth)acrylate, benzyl (meth)acrylate, naphthyl (meth)acrylates, phenoxyalkyl (meth)acrylates such as phenoxyethyl (meth)acrylate and phenoxybutyl (meth)acrylate, alkylene glycol di(meth)acrylates such as ethylene glycol di(meth)acrylate and propylene glycol di(meth)acrylate, other polyalkylene glycol di(meth)acrylates than monomers (I) such as polyethylene glycol di(meth)acrylates and polybutylene glycol di(meth)acrylates, neopentylglycol di(meth) acrylate and bisphenol-A di(meth)acrylates derivatives.

Amongst the bisphenol-A di(meth)acrylate compounds, the compounds of the following formulae may be mentioned:

wherein $R_5$ represents H or $CH_3$ and $n_1+n_2$ has a mean value of from 0 to 40.

Preferred compounds with the above mentioned formula are those for which $R_5=CH_3$ and $\overline{n_1+n_2}=2.6$ (EBADMA), $\overline{n_1+n_2}=4$ (DBADMA), $\overline{n_1+n_2}=10$ (OBADMA) and $\overline{n_1+n_2}=30$.

The monomer (IV) can be a monomer or a mixture of monomers having the formula (I) and wherein $m_1$ or $m_2$ is an integer lower than 4. However, in this case, the quantity of monomers (IV) is preferably such that the mean value:

$$\overline{m} = \sum_{m=4}^{20} X_m \cdot m$$

is at least equal to 4 and preferably at least equal to 5.

The monomer (IV) is preferably such that its homopolymer has a refraction index lower than or equal to 1.54.

These other monomers (IV) generally represent from 0% to 40% by weight, preferably 0% to 20%, more preferably from 0% to 10% by weight based on the total weight of monomers (I), (II) and (III) in the composition.

The compositions according to the invention also include a polymerization initiating system. The polymerization initiating system may include one or more thermal or photochemical polymerization initiators or a thermal or photochemical polymerization initiator mixture as well. These initiators are well known in the art and any conventional initiator may be used. Amongst the thermal polymerization initiators useful in the present invention, peroxides may be mentioned such as benzoyl peroxide, cyclohexyl peroxydicarbonate and isopropyl peroxydicarbonate.

The photoinitiators may include particularly 2,4,6-trimethylbenzoyldiphenylphosphine oxide, 1-hydroxycyclohexylphenyl-ketone, 2,2-dimethoxy-1,2-diphenylethane-1-one and benzoyl alkyl ethers.

Initiators are generally used in a proportion between 0.01% to 5% by weight based on the total weight of the polymerizable monomers included in the composition.

The polymerizable compositions according to the invention may also include additives conventionally used in polymerizable compositions for moulding optical or ophthalmic items, particularly glasses and lenses, in conventional proportions, namely inhibitors, dyes, UV absorbers, perfumes, deodorants, antioxidants, anti-yellowing agents and photochromic compounds.

The monomeric compositions according to the invention usually have a viscosity equal to or lower than 0.3 Pa·s and preferably lower than 0.2 Pa·s.

The compositions according to the invention can be thermally or photochemically polymerized or by a combination of both.

The present invention will now be more fully described in the following examples. In these examples, unless otherwise mentioned, all percentages and parts are expressed by weight.

EXAMPLES 1 TO 17

1) Preparation of the Compositions

Polymerizable compositions mentioned in table I hereafter are prepared according to the following method:

Different components of the compositions are weighed in a room with controlled light, in smoked glass vials.

CD6440P, the monomer (I), and the comonomers (II) and (III) as well as a photoinitiator and a UV absorber are mixed with a sustained stirring for a few minutes. A thermal initiator, stored at low temperature, is added in the last step (for stability reasons).

2) Cast Process

Compositions prepared as indicated above are cast in moulds formed with two mineral glass mould parts previously cleaned with soda and parallely assembled with a Barnier adhesive tape and located 2 mm apart from each other. The casting is carried out in the following way:

the composition is taken out by means of a sterile syringe (20 ml), the adhesive tape is partially disassembled to generate an opening, the syringe tip is introduced through the opening, the composition is injected in the mould, and the adhesive tape is readjusted to seal the mould.

3) Photochemical Prepolymerization

The filled moulds are placed in a photochemical polymerization oven which includes two UV PRIMA lamps (mercury lamps) positioned on both sides of the moulds at equal distance and each mould receives from each lamp an illumination of approximately:

40 mW/cm$^2$ 125 mW/cm$^2$

Infra-red measures enable to follow the conversion of the double (meth)acrylic bonds as a function of the UV irradiation time.

4) Thermal Polymerization and Annealing

After polymerization, the adhesive tape is removed and the assembly put in a drying-room at 100° C. for 2 hours in order to complete polymerization; the glasses are then removed from the moulds and checked with an arc lamp. A final annealing allows to improve polymerization and to relax the remaining stresses from the resulting substrate.

The features of the resulting substrates are listed in table II.

The yellow index Yi has been measured according to ASTM D 1925 standard.

Colourability measure (% Tv red).

The given measure is the transmission value measured in the visible range of a 2 mm thick glass at the centre which is coloured by dipping in an aqueous bath at 94° C. in which a "disperse Red 13" red pigment from Eastman Kodak is dispersed.

The Tg measure is carried out by DMA (dynamic mechanical analysis) on a planar 5.2 cm×1 cm×2 mm (thickness) sample.

The test is carried out in a 3 point bending.

Tg corresponds to the maximum of ratio:

E″ (loss modulus)/E′ (conservation modulus)

TABLE 1

| Comp. components | 1 | 2 | 3 | 4 | 5 | 6 | 7 | 8 | 9 | 10 | 11 |
|---|---|---|---|---|---|---|---|---|---|---|---|
| (1) parts by weight (pp) | CD6440P (52) | CD6440P (52) | CD6440P (52) | CD6440P (52) | CD6440P (45) | CD6440P (45) | CD6440P (54) | CD6440P (54) | CD6440P (54) | CD6440P (54) | CD6440P (48) |
| (II) (pp) | PLEX (33) | PLEX (33) | PLEX (33) | PLEX (33) | PLEX (37.5) | PLEX (45) | PLEX (36) | PLEX (36) | PLEX (36) | PLEX (36) | PLEX (32) |
| (III) (pp) | tBCHMa (15) | iBMa (15) | M$_3$CHMa (15) | SR423 (15) | iBMa (17.5) | DCP (10) | FA513A (10%) | FA513A (10) | tBCHMa (10) | DCP (10) | FA513A (20) |
| Photoinitiator (%) | CGI1850 (0.06) | CGI1850 (0.06) | CGI1850 (0.06) | CGI1850 (0.06) | CGI1850 (0.06) | CGI1850 (0.06) | CGI1850 (0.06) | CGI1850 (0.06) | CGI1850 (0.06) | CGI1850 (0.06) | CGI1850 (0.06) |
| Thermal initiator (%) | tBPEH (0.1) | tBPEH (0.1) | tBPEH (0.1) | tBPEH (0.1) | tBPEH (0.1) | tBPEH (0.1) | tBPEH (0.1) | tBPEH (0.1) | tBPEH (0.1) | tBPEH (0.1) | tBPEH (0.1) |
| UV absorber (%) | UV5411 (0.08) | UV5411 (0.08) | UV5411 (0.08) | UV5411 (0.08) | UV5411 (0.08) | UV5411 (0.08) | UV5411 (0.08) | UV5411 (0.08) | UV5411 (0.08) | UV5411 (0.08) | UV5411 (0.08) |

| Comp. components | 12 | 13 | 14 | 15 | 16 | 17 |
|---|---|---|---|---|---|---|
| (1) parts by weight (pp) | CD6440P (48) | CD6440P (48) | CD6440P (48) | CD6440P (60) | CD6440P (60) | CD6440P (64) |
| (II) (pp) | PLEX (32) | PLEX (32) | PLEX (32) | SR290 (10) | SR368 (10) | CN964 (10) |
| (III) (pp) | FA513M | tBCHMa | DCP | DCP | DCP | DCP |

TABLE 1-continued

| | (20) | (20) | (20) | (30) | (30) | (26) |
|---|---|---|---|---|---|---|
| Photoinitiator (%) | CGI1850 (0.06) | CGI1850 (0.06) | CGI1850 (0.06) | CGI1850 (0.06) | CGI1850 (0.06) | CGI1850 (0.06) |
| Thermal initiator (%) | tBPEH (0.1) | tBPEH (0.1) | tBPEH (0.1) | tBPEH (0.1) | tBPEH (0.1) | tBPEH (0.1) |
| UV absorber (%) | UV5411 (0.08) | UV5411 (0.08) | UV5411 (0.08) | UV5411 (0.08) | UV5411 (0.08) | UV5411 (0.08) |

CD6440P=Polypropylene glycol 400 dimethacrylate from CRAY VALLEY company

PLEX®=PLEX 6661-0 (diurethane dimethacrylate) from ROHM company

SR290®=tri[ethyl methacrylate] isocyanurate from CRAY VALLEY company

SR368®=tri[ethylacrylate] isocyanurate from CRAY VALLEY company

FA513A=Tricyclodecanyl acrylate from FRANCRYL company of

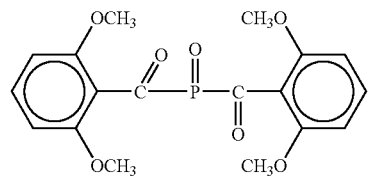

and of

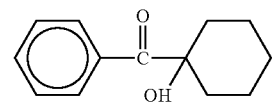

TABLE 2

| Ex. | 1 | 2 | 3 | 4 | 5 | 6 | 7 | 8 | 9 | 10 | 11 |
|---|---|---|---|---|---|---|---|---|---|---|---|
| $n_e$ | 1.496 | 1.499 | 1.495 | 1.499 | 1.501 | 1.503 | 1.499 | 1.500 | 1.497 | 1.501 | 1.502 |
| $v_e$ | 56 | 56 | 57 | 56 | 55 | 54 | 56 | 57 | 55 | 55 | 55 |
| D | 1.12 | 1.13 | 1.12 | 1.13 | 1.13 | 1.15 | 1.14 | 1.14 | 1.13 | 1.15 | 1.14 |
| Yi (2 mm) | 1.6 | 1.8 | 1.7 | 2.1 | 1.1 | 1.9 | 1.2 | 1.4 | 1.5 | 1.2 | 1.0 |
| % Tv red | 51 | 50 | 54 | 53 | 55 | 50 | 36 | 40 | 38 | 38 | 40 |
| Tg (° C.) | 96 | 96 | 96 | 100 | 108 | 100 | 82 | 88 | 90 | 93 | 82 |
| E' 25° C. (Mpa) | 1730 | 2000 | 1950 | 1930 | 2200 | 2000 | 1780 | 1670 | 1700 | 1650 | 1720 |
| E' 100° C. (Mpa) | 103 | 118 | 100 | 125 | 220 | 200 | 62 | 80 | 75 | 145 | 80 |

| Ex. | 12 | 13 | 14 | 15 | 16 | 17 |
|---|---|---|---|---|---|---|
| $n_e$ | 1.504 | 1.496 | 1.504 | 1.505 | 1.502 | 1.502 |
| $v_e$ | 56 | 56 | 55 | 55 | 55 | 55 |
| D | 1.135 | 1.11 | 1.15 | 1.14 | 1.14 | 1.13 |
| Yi (2 mm) | 1.5 | 1.5 | 1.2 | 1.5 | 1.4 | 1.4 |
| % Tv red | 50 | 52 | 46 | 45 | 46 | 43 |
| Tg (° C.) | | | 93 | 100 | 100 | 88 |
| E' 25° C. (Mpa) | | | 1940 | 1500 | 1490 | 1540 |
| E' 100° C. (Mpa) | | | 300 | 420 | 360 | 300 |

$n_e$ = refraction index
$v_e$ = Abbe number
d = density
Yi = yellow index

FA513M=Tricyclodecanyl methacrylate from FRANCRYL company
tBCHMa=Tert-butyl methacrylate from ROHM company
DCP=Tricyclodecane dimethanol dimethacrylate
SR423®=Isobornyl methacrylate from CRAY VALLEY
iBMa=Isobornyl methacrylate (ROHM)
tBPEH=Tert-butyl peroxy-2-ethylhexanoate
M₃CHMa=Trimethylcyclohexyl methacrylate
UV5411=2-(2'-hydroxy-5'-t-octylphenyl)benzotriazole from American Cyanamid company
CGI1850=photoinitiator from CIBA GEIGY company, made up of a mixture (in a mass ratio of 50/50)

E'25 and E'100=elastic moduli at 25° C. and 100° C. respectively.

The viscosities are determined on 250 ml samples by means of a Brookfield viscometer DV2 model at shear rates varying from 6 to 60 rotations per minute (mobile no. 61 or no. 62). Mobile no. 61 has been used with a shear rate of 12 rotations/minute.

The refraction indexes (λ=546 nm) and the Abbe numbers have been determined at 25° C. by means of a BELLINGHAM-STANLEY LIMITED ABBE 60/TR refractometer using different lamps (sodium, mercury and cadmium) as light sources.

The DMA analyses have been carried out with a Rheometrics Solid Analyser RSA II device on 52×10×2 nm samples at a 1 Hz frequency and on a temperature range of −50° C. to 170° C. at 2° C./minute.

Impact Resistance Test

An impact resistance test has been carried out on the ophthalmic a lenses of examples 2 and 5 respectively having a central thickness of 1.09 mm and 1.01 mm and a −2 diopter power, by dropping balls with an increasing kinetic energy at the centre of lenses until the lens breaks or has a star-shaped cracks and the mean breaking energy is determined.

The obtained results are as follows:

Example 2 lens: 3400 mJ+/−1800

Example 5 lens: 3800 mJ+/−1600

20 ophthalmic lenses according to example 1, having a thickness of 1.01 mm+/−0.07 mm at the centre and a −2 diopter power have undergone the previous impact resistance test.

The average breaking energy equals 3430 mJ +/−1250.

Water Absorption Test

A glass according to example 1 and a glass according to example 6 have been weighed, dried in an oven and subsequently dipped in water at 90° C. for 30 minutes. The glasses have been removed, wiped and weighed again.

The water absorption rate has been calculated:

$$T_{water} = \frac{\text{Weight after water treatment} - \text{Initial weight}}{\text{Initial weight}} \times 100$$

Values of respectively 0.58 and 0.75% have been found for the glasses of examples 1 and 6.

The invention claimed is:

1. A polymerized monomeric composition comprising:
   (a) from 35 to 70 parts by weight of one or more monomers (I) of formula:

$$CH_2=\overset{R_1}{\underset{}{C}}-\underset{O}{\overset{}{C}}-O-A-\overset{R_2}{\underset{}{C}}-\underset{O}{\overset{}{C}}=CH_2$$

wherein
   $R_1$ and $R_2$ represent H or $CH_3$,
   A is a divalent moiety of formula:

$$-(CH_2-CH_2-CH_2O)- \; m1 \quad \text{or} \quad -(CH_2-\underset{CH_3}{\overset{}{CH}}-O)- \; m2$$

m1 and m2 each are an integer in the range of 4 to 20, (b) from 5 to 50 parts by weight of a monomer (II) comprising a formula:

$$Q[W-O-\underset{O}{\overset{}{C}}-\overset{R}{\underset{}{C}}=CH_2]_n$$

wherein
   Q moiety is a divalent moiety comprising a formula:

$$-O-\underset{O}{\overset{}{C}}-NR'_1-X-NR'_2-\underset{O}{\overset{}{C}}-O-$$

wherein X represents a straight or a branched divalent alkyl chain comprising 1 to 12 carbon atoms, and $R'_1$ and $R'_2$ independent from one another represent H or $CH_2$;
   W is a divalent alkyl moiety, with a straight or branched structure, comprising from 1 to 5 carbon atoms;
   n varies from 2 to 4;
   R represents H or $CH_3$; and
   $R^1$ represents H or a valence link; and
   (c) from 5 to 40 parts by weight of a monomer (III) with a high Abbe number comprising at least one non aromatic cyclic or polycyclic hydrocarbon moiety and further comprising one or more methacrylate functions, the total of the monomers (I), (II), and (III) representing 100 parts by weight.

2. The composition of claim 1, wherein in the monomer of formula (I), said divalent unit A represents:

$$-(CH_2-\underset{CH_3}{\overset{}{CH}}-O)- \; m^2$$

wherein m2 is an integer in the range of 4 to 20.

3. The composition of claim 1, further defined as comprising from 40 to 60 parts by weight of monomers (I).

4. The composition of claim 1, wherein $m_1$ and $m_2$ are integers from 5 to 10.

5. The composition of claim 1, wherein W is $-CH_2CH_2$.

6. The composition of claim 1, wherein the monomer (II) comprises a formula:

$$CH_2=\overset{CH_3}{\underset{}{C}}-\underset{O}{\overset{O}{C}}-O-CH_2-CH_2-O-\underset{O}{\overset{O}{C}}-NH-CH_2-\overset{CH_3}{\underset{R'_3}{\overset{}{C}}}-CH_2$$

$$CH_2=\overset{CH_3}{\underset{}{C}}-\underset{O}{\overset{O}{C}}-O-CH_2-CH_2-O-\underset{O}{\overset{O}{C}}-NH-CH_2-CH_2-\overset{CH_3}{\underset{CH_3}{\overset{}{C}}}-R'_4$$

wherein $R'_3$ and $R'_4$ represent, independently from one another, H or $CH_2$.

7. The composition of claim 1, further defined as comprising 30 to 40 parts by weight of monomer (II).

8. The composition of claim 1, wherein the monomer (III) comprises a formula:

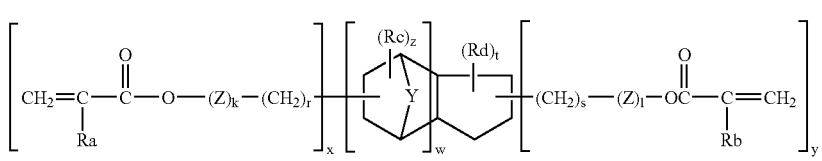

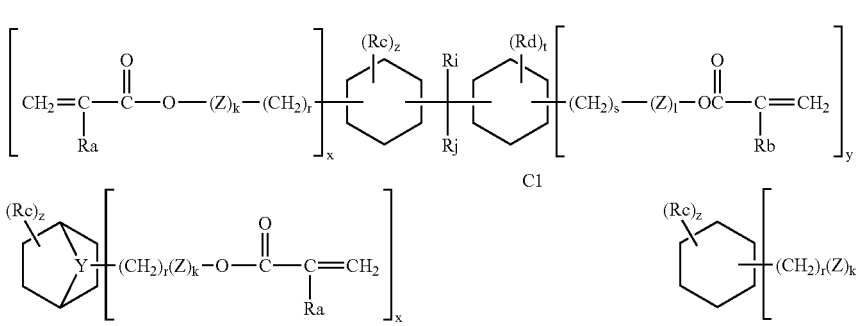

wherein

Y is a divalent moiety of —O—, —(CH$_3$)$_2$—, —CH(CH$_3$)—;

Z is a divalent moiety of —(CH$_2$)$_p$—O—, or

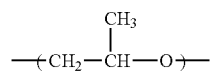

wherein p is an integer from 1 to 4;

R$_a$, R$_b$ represent independently from one another, H or CH$_3$;

R$_c$, R$_d$ represent, independently from one another, a straight or a branched alkyl moiety comprising from 1 to 6 carbon atoms;

R$_i$, R$_j$ represent, independently from one another, a straight or a branched alkyl moiety comprising from 1 to 10 carbon atoms, w is an integer of 1 to 3, x is an integer of 0 to 3, y is an integer of 0 to 3, providing that x+y is equal to or higher than 1, k is an integer of 0 to 6, l is an integer of 0 to 6, r is an integer of 0 to 6, s is an integer of 0 to 6, z is an integer of 0 to 3 and t is an integer of 0 to 3.

9. The composition of claim 8, wherein the monomer (III) comprises a formula:

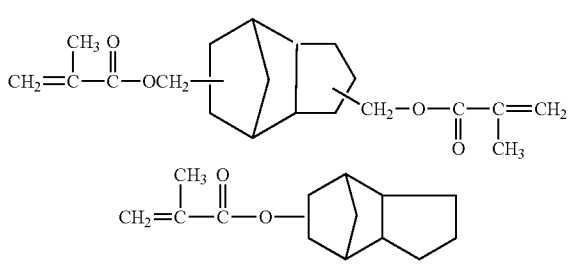

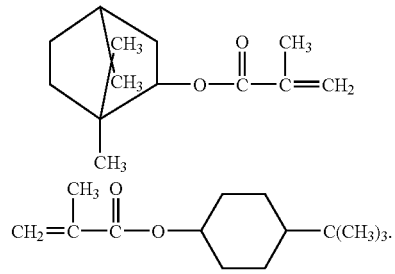

10. The composition of claim 1, further defined as comprising from 10 to 30 parts by weight of monomer (III).

11. The composition of claim 1, wherein monomers (II) and (III) each provide, through homopolymerization, a homopolymer with a refraction index lower than or equal to 1.54.

12. The composition of claim 1, further defined as comprising one or more monomers (IV) polymerizable by radical mechanism and that are different from the monomers (I), (II), and (III), in a proportion of 0 to 40% by weight based on the total weight of monomers (I), (II), and (III).

13. The composition of claim 12, wherein the monomer (IV) is such that its homopolymer has a refraction index lower than or equal to 1.54.

14. The composition of claim 12, wherein X represents a straight or a branched divalent alkyl chain comprising from 1 to 5 carbon atoms.

15. The composition of claim 1, wherein X represents a straight or a branched divalent alkyl chain comprising from 8 to 12 carbon atoms.

16. The composition of claim 1, wherein further defined as comprising a viscosity lower than or equal to 0.3 Pa·s.

17. A transparent polymer substrate with a refraction index varying between 1.48 and 1.52, wherein the polymer substrate is obtained through polymerization of the composition of claim 1.

18. An optical lens comprising a polymer substrate of claim 16.

19. The optical lens of claim 18, further defined as an ophthalmic lens.

20. The optical lens of claim 19, wherein the lens comprises glass.

* * * * *

UNITED STATES PATENT AND TRADEMARK OFFICE
CERTIFICATE OF CORRECTION

PATENT NO. : 7,049,381 B2
APPLICATION NO. : 09/824998
DATED : May 23, 2006
INVENTOR(S) : Gilles et al.

It is certified that error appears in the above-identified patent and that said Letters Patent is hereby corrected as shown below:

Column 15, line 44, delete "of formula" and insert --comprising a formula-- therefor.

Column 15, line 65, delete "20," and insert --20;-- therefor.

Column 15, line 66, delete "a monomer" and insert --one or more monomers-- therefor.

Column 16, line 17, delete "atoms," and insert --atoms-- therefor.

Column 16, line 18, delete "independent from one another" and insert

--, independent from one another,-- therefor.

Column 16, line 21, after "comprising", delete "from" therefor.

Column 16, line 34, after "divalent", delete "unit" therefor.

Column 16, line 47, after "-CH2CH2", insert "—" therefor.

Column 17, line 46, delete "atoms," and insert --atoms;-- therefor.

Column 18, line 55, delete "12" and insert --1-- therefor.

Column 18, line 35, before "##STR00027##," insert --or-- therefor.

Signed and Sealed this

Third Day of October, 2006

JON W. DUDAS
*Director of the United States Patent and Trademark Office*